No. 847,948. PATENTED MAR. 19, 1907.
D. T. KENNEY.
APPARATUS FOR REMOVING DUST.
APPLICATION FILED MAR. 16, 1903.
2 SHEETS—SHEET 1.
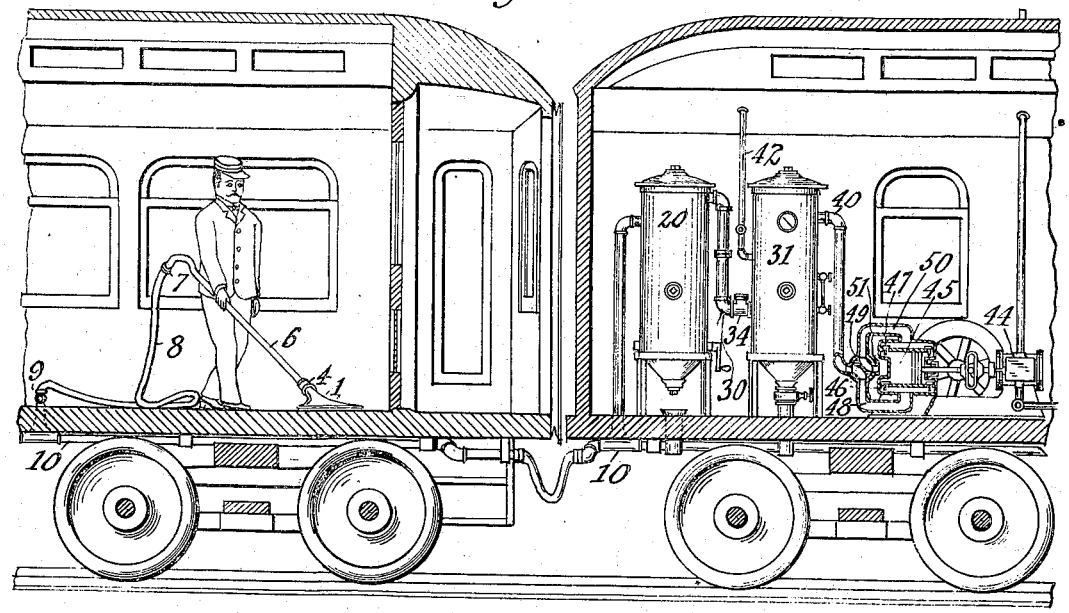
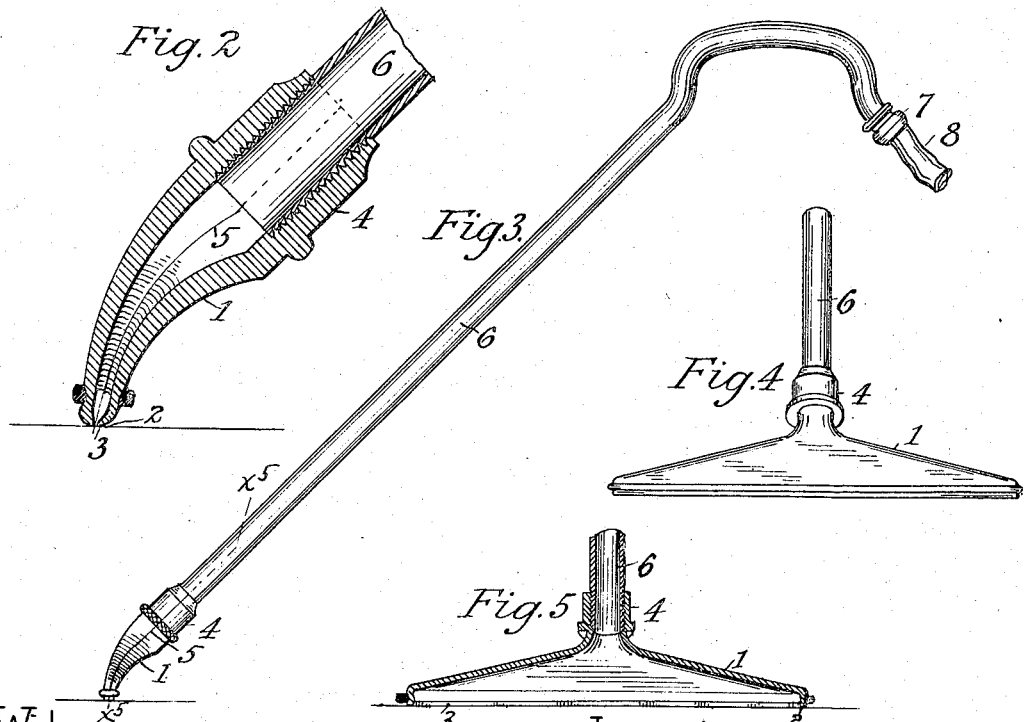
Witnesses:
Edward J. Murphy
Samuel W. Balch
Inventor,
David T. Kenney.
by Thomas Ewing, Jr.,
Attorney.

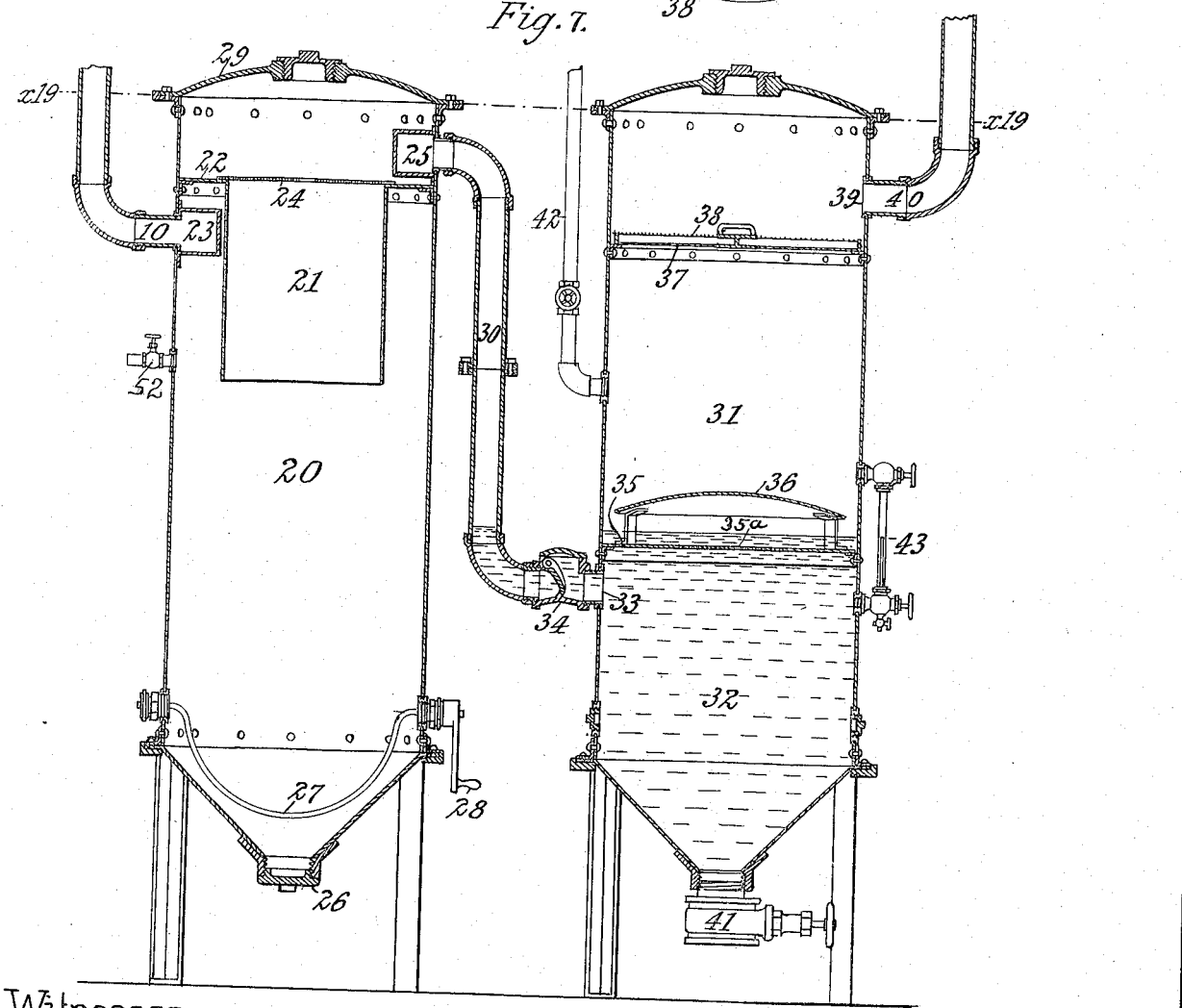

UNITED STATES PATENT OFFICE.

DAVID T. KENNEY, OF NORTH PLAINFIELD, NEW JERSEY, ASSIGNOR TO VACUUM CLEANER COMPANY, OF NORTH PLAINFIELD, NEW JERSEY, A CORPORATION OF NEW JERSEY.

APPARATUS FOR REMOVING DUST.

No. 847,948.      Specification of Letters Patent.      Patented March 19, 1907.

Application filed March 16, 1903. Serial No. 147,968.

*To all whom it may concern:*

Be it known that I, DAVID T. KENNEY, a citizen of the United States of America, and a resident of the borough of North Plainfield, in the county of Somerset and State of New Jersey, have invented certain new and useful Improvements in Apparatus for Removing Dust, of which the following is a specification.

The invention relates to apparatus for removing dust from carpets, curtains, or other fabrics and floors, walls, ceilings, or other places where dust accumulates.

In the present invention suction is utilized so that the dust is drawn into the apparatus and entirely removed from the fabrics or surfaces at the place of operation. The dust is separated from the air within separators in an efficient, reliable, and practical manner.

My invention consists of certain features of construction and combinations of parts to be hereinafter described and then particularly claimed.

In the accompanying two sheets of drawings, which form a part of this application, Figure 1 is a sectional elevation of parts of two cars of a railway-train, showing in elevation the apparatus constructed in accordance with my invention. Fig. 2 is a vertical section through the head of a hand implement particularly adapted for floor-cleaning. Fig. 3 is a side elevation of the entire hand implement of Fig. 2. Fig. 4 is a front elevation of the lower part of hand implement of Fig. 2. Fig. 5 is a vertical section of the head of the hand implement on the line $x^5$ $x^5$ of Fig. 3. Fig. 6 is a transverse section through the separators on the line $x^{19}$ $x^{19}$ of Fig. 7. Fig. 7 is a vertical section through the separators on the line $x^{20}$ $x^{20}$ of Fig. 6.

The apparatus comprises a hand implement which is applied to and moved over the surface to be cleaned and through which the dust and dirt is drawn by suction, a double separator in which a partial vacuum is maintained, a suction-creating device which is preferably a piston-pump for maintaining the vacuum in the separator, air connections between the pump and separator, and air connections consisting at least in part of flexible-pipe connections between the hand implement and the separator.

In the form of hand implement illustrated in detail in Figs. 2, 3, 4, and 5 a stock 1, which is in the shape of a nose or nozzle and incloses a suction-chamber, has formed on it a contact-surface 2, which is pierced by a narrow and restricted slot 3. The slot is in unobstructed communication with the chamber and is bounded and defined by lips which surround the slot. These lips forming the edges at the outer end or mouth of the slot also form the contact-surface of the cleaner, and the outward mouth of the slot lies in the plane of this contact-surface, so that when the cleaner is applied to a floor or other surface to be cleaned the lips and restricted outward mouth of the slot will be brought into contact therewith.

When applied to carpeted floors, the air is drawn upward through the interstices of the carpet and all dust is disentangled and removed without subjecting the fabric to any mechanical action that will wear it away.

The stock is united to the tubular portion of the passage-way for the air through the union 4. The suction-chamber in the stock is merely a communicating passage-way for the air between the slot and the tubular portion of this passage-way. It is of sufficient capacity to freely allow the air to pass and is without sharp corners or enlarged portions where the velocity of the air can become reduced and the dust deposited. In order that surfaces forming the interior of the chamber and the slot can be made smooth and freed from all irregularities before the two parts are joined together, the stock is made of two pieces. These are joined along the line 5, usually by brazing. In this form the handle 6, which is joined to the stock by the union 4, is tubular and serves to conduct the air and suspended dust and dirt from the suction-chamber in the stock. The upper end of the handle is connected through a union 7 with a flexible pipe 8, the other end of which is connected through a union 9 with a pipe 10, leading to the separator. All the unions, elbows, and other pipe-fittings are designed to make flush inner joints, so that the passage-way for the air, dust, and dirt through the pipes will be free from corners and sharp bends.

Other forms of hand implements may be used—as, for example, that illustrated and described in my Patent No. 826,513, dated July 17, 1906, and filed as a division of this application.

The drawings illustrate two separators—a dry separator and a wet separator—through which the air is passed successively in order to free it from the dust and dirt before it is drawn into the pump. The dry separator comprises a vertical cylindrical casing 20, within which a flue or baffle-throat 21 is suspended concentrically with the casing. The space between the upper end of the baffle-throat and the casing is closed by an annular flange 22, thus separating the unitary casing into two compartments. Into the compartment below the flange opens an air-inlet 23, which is directed tangentially between the casing and interior flue and delivers the dust-laden air from the pipe 10 into this dry separator, whereby a rotary movement is imparted to the air in the separator. The centrifugal force due to this rotary movement tends to throw the dust in the air against the cylindrical side walls, and the separation is further assisted by the reduced velocity of the air in the chamber and by the reduced carrying power of the air, owing to its additional rarefication in the cylinder. The course of the air is in a descending spiral between the baffle-throat and the side walls toward the bottom of the casing and thence upward with reduced velocity through the baffle-throat, which is of much greater diameter than the inlet. A wire-mesh screen 24 may, as shown in the drawings, be added over the top of the baffle-throat. From the upper chamber the air passes through an air-outlet 25. This air-outlet should also be directed tangentially. The heavier particles of dust are separated from the air in this separator. Owing to the partial exhaustion of the air from the casing, the exterior walls are subjected to the atmospheric pressure, and it is necessary that they be of such strength that they will not be collapsed by this pressure. As this is equally necessary for the walls of the compartment both above and below the flange of the interior flue or baffle-throat, it is desirable both for strength and simplicity of construction that both chambers be inclosed by the same unitary casing. The interior flue and flange are entirely relieved thereby of pressure strains. The bottom of the casing is funnel-shaped and is provided with an opening which may, as shown in the drawings, be closed by a screw-cap 26. This cap is removable to let out the accumulated dirt. A stirrer 27 can be operated inside the funnel by a crank 28 outside the casing to break up the dirt so that it will more rapidly pass out. The top 29 of the casing is removably secured by bolts.

From the air-outlet of the dry separator the air, with such fine and light dust as it may still carry in suspension, passes through a pipe 30 to the wet separator. This comprises a casing 31, which is conveniently made of similar construction to the casing of the dry separator in the form of a vertical cylinder. The lower portion 32 of this casing is filled with water or other suitable liquid and constitutes a liquid-chamber. There is an air-inlet 33 dipping into the liquid to which the pipe 30 is connected, and the air, with the dust which may still be carried by the air, is discharged into the liquid. Since the vacuum in the dry separator will be sustained for a longer time than the vacuum in the wet separator, when the pump is stopped a gravity-valve 34 is provided to prevent water from being forced over into the dry separator. Between the air-inlet and the surface of the liquid a transverse partly-perforated plate 35 is secured. This plate is preferably horizontal. Its function is to break up the bubbles of air rising in the liquid into smaller bubbles, so that the dust remaining in the air will be more completely brought into contact with the liquid and removed thereby. The rapid discharge of the air-bubbles through the liquid-surface from the restricted perforated portion $35^a$ of the plate causes a spray, and a deflector-plate 36 is supported above the surface of the liquid over the perforations of the perforated plate to catch and turn back the spray. The deflector is concave and extends beyond the perforated part of the plate in order the better to arrest the spray which is dashed against its central portion and runs off at the periphery. The air discharged under the deflector passes out under the edges and through the liquid which is dripping back from the deflector and is thereby still further purified. The velocity of the air is reduced by its passage through the large area of the annular space between the hood and casing, so that the liquid drops are not carried upward, except, possibly, in light vapor, which is largely precipitated at once, owing to the further rarefaction and consequent cooling of the air. The purified air then rises in the chamber of the casing above the liquid, passes through screens 37 38, which create an even and slow current above the deflector, and catch and turn back such drops of the liquid as may reach them. The air is drawn out at the outlet 39 through the pipe 40 to the suction-creating device.

The lower end of the casing is funnel-shaped and is closed by a valve 41. This is opened to discharge the liquid and solid matter which is separated in this casing. A liquid-pipe 42 is provided for filling the liquid-chamber of the separator, and a sight-gage 43 is provided to show the level of the liquid.

The bulk of the dirt is separated in the dry separator, and the liquid in the wet separator does not become foul as rapidly. Furthermore, if the wet separator is arranged to discharge through traps into drainage-pipes the dry separator will separate lint and dust that would become thick mud, which if allowed to pass into the wet separator and out into the drainage pipes and traps would clog the latter. The dry separator and the wet separator combined are also important as a safeguard to keep injurious dust and dirt from reaching the pump.

The pipe 40 conducts the air to the suction-creating device. In Fig. 1 I show a steam-pump comprising a steam-cylinder 44 and an air-cylinder 45, intake-valves 46, and exhaust-valves 47. Pipe connections 48 lead from a four-way cock 49 to the intake-valves, and pipe connections 50 lead from the exhaust-valves to the four-way cock. The pipe 40 also leads into the four-way cock from the wet separator, and this separator is ordinarily connected through the pipe 40, one of the channels of the four-way cock, and the connection 48 to the intake-valves of the pump. The air exhausted from the pump is discharged through the port 51 of the four-way cock. If desired, connections may be made between this port and a point out of doors where the discharge will be less likely to inconvenience any one. The four-way cock or other convenient valve arrangement enables a reversal of the action of the pump from an exhaust to a pressure pump should this reversal prove desirable for blowing out the separator or cleaning the screens.

A cock 52 is provided for relieving the vacuum in the dry separator when the pump is stopped and it is to be emptied of dust.

The system herein described can be used for cleaning corridors, halls, or walls covered with hard wood, tiling, marble, rubber, or other material requiring scrubbing with water, the dry dust being first taken up, the surface then being scrubbed, and the wash-water taken up by the system in the same manner as the dry dust is taken up by it. For carpets or other fabrics requiring scrubbing it is equally adaptable, the suds and water being drawn out by passing the sweeper over them. At the same time the sweeper operates to dry the surface or fabric.

The specific form of hand implement shown herein forms the subject-matter of my application filed June 6, 1906, Serial No. 320,437, and being claimed therein is not claimed in this application, it being shown merely to illustrate one of the many forms which the hand implement may assume.

Without limiting myself to the details shown, what I claim, and desire to secure by Letters Patent, is—

In a suction cleaning apparatus, the combination of a suction-nozzle adapted to be moved over the surface to which it is applied for cleaning and having a narrow inlet-slot, a power-operated suction-pump, and impurity-collecting means between said nozzle and pump adapted to remove the impurities from the air and prevent fouling the pump while permitting the working vacuum to be maintained at the nozzle, said impurity-collecting means including a dry collecting device through which the air passes from the suction-nozzle and a liquid-separator between said device and the vacuum-pump, substantially as described.

Signed at New York city, (borough of Manhattan,) New York, this 14th day of March, 1903.

DAVID T. KENNEY.

Witnesses:
 THOMAS EWING, Jr.,
 RICHARD S. HARVEY.